United States Patent [19]

Bercx

[11] Patent Number: 5,213,450
[45] Date of Patent: May 25, 1993

[54] APPLIANCE FOR THE DISPENSING OF BULK MATERIAL

[75] Inventor: Helmut Bercx, Wolfegg, Fed. Rep. of Germany

[73] Assignee: AVT Anlagen- und Verfahrenstechnik GmbH, Weingarten, Fed. Rep. of Germany

[21] Appl. No.: 806,254

[22] Filed: Dec. 13, 1991

[30] Foreign Application Priority Data

Dec. 21, 1990 [DE] Fed. Rep. of Germany ....... 4041110

[51] Int. Cl.$^5$ .......................................... B65G 53/46
[52] U.S. Cl. .................................... 406/128; 406/127; 406/130; 222/242; 222/442; 222/452
[58] Field of Search ................ 406/64, 66, 124, 125, 406/127, 128, 130, 135; 222/370, 242, 442, 452; 414/221, 217

[56] References Cited

U.S. PATENT DOCUMENTS

| Re. 29,347 | 8/1977 | Friedman . | |
|---|---|---|---|
| 599,688 | 3/1898 | Coy | 222/452 X |
| 1,207,832 | 12/1916 | Allington | 406/66 |
| 2,314,031 | 3/1943 | Colburn | 222/370 X |
| 2,854,173 | 9/1958 | Lalin | 222/242 X |
| 3,260,415 | 7/1966 | Minamiyama et al. | 222/452 X |
| 3,995,777 | 12/1976 | Diez et al. | 222/370 |
| 4,326,651 | 4/1982 | Sabase et al. | 222/452 X |
| 4,491,243 | 1/1985 | Koga et al. | 222/452 X |

FOREIGN PATENT DOCUMENTS

| 538178 | 8/1984 | Australia . | |
|---|---|---|---|
| 0372611 | 6/1990 | European Pat. Off. . | |
| 704740 | 4/1941 | Fed. Rep. of Germany | 222/370 |
| 2838946 | 3/1980 | Fed. Rep. of Germany | 222/452 |
| 3025048 | 2/1981 | Fed. Rep. of Germany . | |
| 3400595 | 7/1985 | Fed. Rep. of Germany . | |
| 3544014 | 2/1987 | Fed. Rep. of Germany . | |
| 3614303 | 11/1987 | Fed. Rep. of Germany . | |
| 106996 | 7/1974 | German Democratic Rep. . | |
| 253235 | 1/1988 | German Democratic Rep. | 406/128 |
| 263733 | 3/1929 | Italy | 222/452 |
| 649010 | 4/1985 | Switzerland . | |
| 1461728 | 2/1989 | U.S.S.R. | 406/64 |
| 943808 | 6/1960 | United Kingdom . | |
| 923603 | 4/1963 | United Kingdom | 222/370 |
| 2166714 | 5/1986 | United Kingdom . | |

Primary Examiner—Russell D. Stormer
Assistant Examiner—James M. Kannofsky
Attorney, Agent, or Firm—Spencer, Frank & Schneider

[57] ABSTRACT

An appliance for dispensing of bulk material includes a circular-cylindrical stationary cellular housing with individual chambers of a cross-section in the form of a segment of a circle, which are closed in an upper and lower region by respective upper and lower rotating cover plates each having an orifice in the form of a segment of an annulus, the dispensing appliance having in its upper and lower region respective receiving flanges for supporting and guiding the rotating cover plates external of the housing. The upper receiving flange and the lower receiving flange for the respective cover plates are formed by respective flanged plates facing away from the cellular housing and respective flanged plates confronting the cellular housing, between which the respective cover plates are supported and mounted rotatably on bearings provided in each of the respective flanged plates axially opposite one another. The appliance further includes a common eccentric drive for rotating the upper and lower cover plates arranged laterally of the cellular housing.

17 Claims, 4 Drawing Sheets

APPLIANCE FOR THE DISPENSING OF BULK MATERIAL

BACKGROUND OF THE INVENTION

1. Field of the Invention

The invention relates to an appliance for the dispensing of bulk material.

2. Background Information

Known appliances for dispensing of bulk material consist of a rotor with radial blades which rotates in a cylindrical housing about a vertical axis and which is covered on its topside by a stationary cover plate provided with perforations for the bulk-material inflow and on its underside by an associated stationary lower cover plate with a discharge orifice, the upper and lower discharge orifices being arranged offset relative to one another at a rotary angle of 180°. Dispensing appliances of this type are designated as horizontal-discharge cellular-wheel sluices.

DE 3,544,014 A 1 has made known a cellular-wheel sluice of this type which serves to convey bulk material out of a space of a pressure of any amount into a space of equal, higher or lower pressure. The cellular-wheel rotor rotating about a vertical axis forms receiving pockets for the bulk material which are filled with the bulk material on the topside of the cellular-wheel sluice and which are emptied on the underside after a rotation of approximately 180°.

Cellular-wheel sluices with rotors rotating about a horizontal axis, which work in fundamentally the same way as described above, are also known.

Cellular-wheel sluices of this type are connected on their discharge side to conveying lines which are under a conveying pressure. However, because of considerable leakage losses in the cellular-wheel sluice, it has not been possible for the pressure and air quantity of these conveying lines to be maintained at the desired level. This is all the more so when a plurality of such cellular-wheel sluices are arranged in succession above a common conveying line, for the purpose of conveying out of various silos.

Leakage losses occur in a cellular-wheel sluice with a rotating rotor as a result of unavoidable gaps both between the rotating rotor and the lower and upper cover plates and between the rotating rotor and the cylinder wall of the rotor housing. Although a high outlay for sealing off these gaps and keeping them small keeps the leakage loss within limits, nevertheless, on account of these leakage losses, the use of cellular-wheel sluices of this kind has been economical only up to an overpressure in the conveying line of the order of approximately 1 bar.

Furthermore, from DE 3,035,048 C 2 is known a dispensing appliance, in which rotating upper and lower cover plates are used instead of a rotating cellular wheel. The cellular housing thus remains stationary. The bulk material is supplied via an upper rotating cover plate with a feed orifice in the form of a segment of a circle. Likewise, the bulk material is discharged from the stationary cells via a lower rotating cover plate with a discharge orifice located opposite the upper feed orifice. The advantage of this dispensing appliance in relation to those with a rotating cellular wheel is that the gap length and, for the same gap width, therefore also the gap area, are considerably reduced, since there is no longer a rotating cellular wheel with corresponding vertical gaps. Instead, here there need only be a horizontal sealing in the upper and lower regions of the rotating cover plates in relation to the cellular housing. A dispensing appliance of this type therefore makes it possible to employ higher conveying pressures or pressure differences between the conveying line below and the silo above the cellular-wheel sluice.

A disadvantage of this known appliance with a stationary cellular housing is the expensive mechanism for executing the rotational movement of the upper and lower cover plates. The drive of the central driving shaft and its expensive mounting and sealing necessitate complicated production involving a high outlay. Moreover, this drive takes up a large part of the central region of the cellular housing. Furthermore, a driving shaft has to be guided radially outwards. In addition to the complicated drive, a dispensing appliance of this type is also difficult to clean, since a dismantling of the individual drive components under practical conditions is extremely complicated and involves a high outlay.

Dispensing appliances having an eccentric drive have become known from US-RE 29,347 or GB 2,166,714 A. In the first-mentioned publication, both the cellular wheel and the two cover plates are driven via a gear. The relationship between these drives affords the conveying power of the dispensing appliance. The dispensing appliance according to GB 2,166,714 contains no chambers in the form of a segment of a circle and is not suitable for conveying relatively large quantities. The drive of the two cover plates takes place in a similar way to DE 3,025,048 C 2 by means of a central shaft.

SUMMARY OF THE INVENTION

In contrast to the known appliances, the advantage of the appliance according to the invention, having the defining features of the main claim, is that there is provided a dispensing appliance of an extremely simple construction which allows a very high pressure difference between the conveying line and the silo, or vice-versa. Complicated drive mechanisms do not pass through the cellular housing, that is to say the drive of the rotating cover plates is offset eccentrically outwards and is arranged laterally of the cellular housing. The drive of the upper and/or lower cover plate appropriately takes place via an external toothing which interacts with a driving pinion. At the same time, the upper and lower driving pinions for the upper and lower cover plates are connected to an associated drive motor via a common driving shaft.

Instead of a gearwheel drive, the cover plates can also be driven via a corresponding toothed-belt drive or a roller chain. The eccentric drive which allows all the driving members to be arranged laterally of the cellular housing is advantageous.

The upper and lower cover plates are loaded eccentrically by the drive. Consequently, these cover plates are guided axially and radially via ball bearings arranged outside the product space, the higher load occurring in the axial direction as a result of the existing pressure difference.

According to the invention, each cover plate is mounted between two flanged plates which themselves also enclose the driving pinion for the cover plate. The entire receiving flange for each cover plate therefore consists of an upper and a lower flanged plate which performs the function of mounting the cover plate and of receiving the associated drive. Seals are at the same time provided in them.

The dispensing appliance has a very simple construction, so that, in particular, the cellular housing can be pivoted out by the simplest actions, if appropriate also to make it possible to carry out a thorough cleaning. This is performed simply by releasing the tension rods, with the result that the cellular housing can be pivoted out laterally, one tension rod serving as a vertical pivot axle for the cellular housing. During this pivoting operation, the upper and lower cover plates remain in an unchanged position, so that the drive for the two cover plates can also remain stationary.

Three tension rods arranged centrally round the cellular housing are appropriately used for bracing the cellular housing, for example one of the tension rods or a hinge at the same time forming the vertical pivot axle for the cellular housing.

Furthermore, the appliance according to the invention provides a venting device which serves for early pressure compensation between a chamber of the cellular housing and the silo.

For this there is a pressure-compensating bore which leads the feed orifice in the cover plate, that is to say which executes a pressure compensation relative to a chamber of the cellular housing before the former comes to rest underneath the feed orifice from the silo.

BRIEF DESCRIPTION OF THE DRAWINGS

Further details and advantages of the invention are given in the following description of an exemplary embodiment. In the associated drawings.

DETAILED DESCRIPTION OF THE PREFERRED EMBODIMENT

Figure 1:
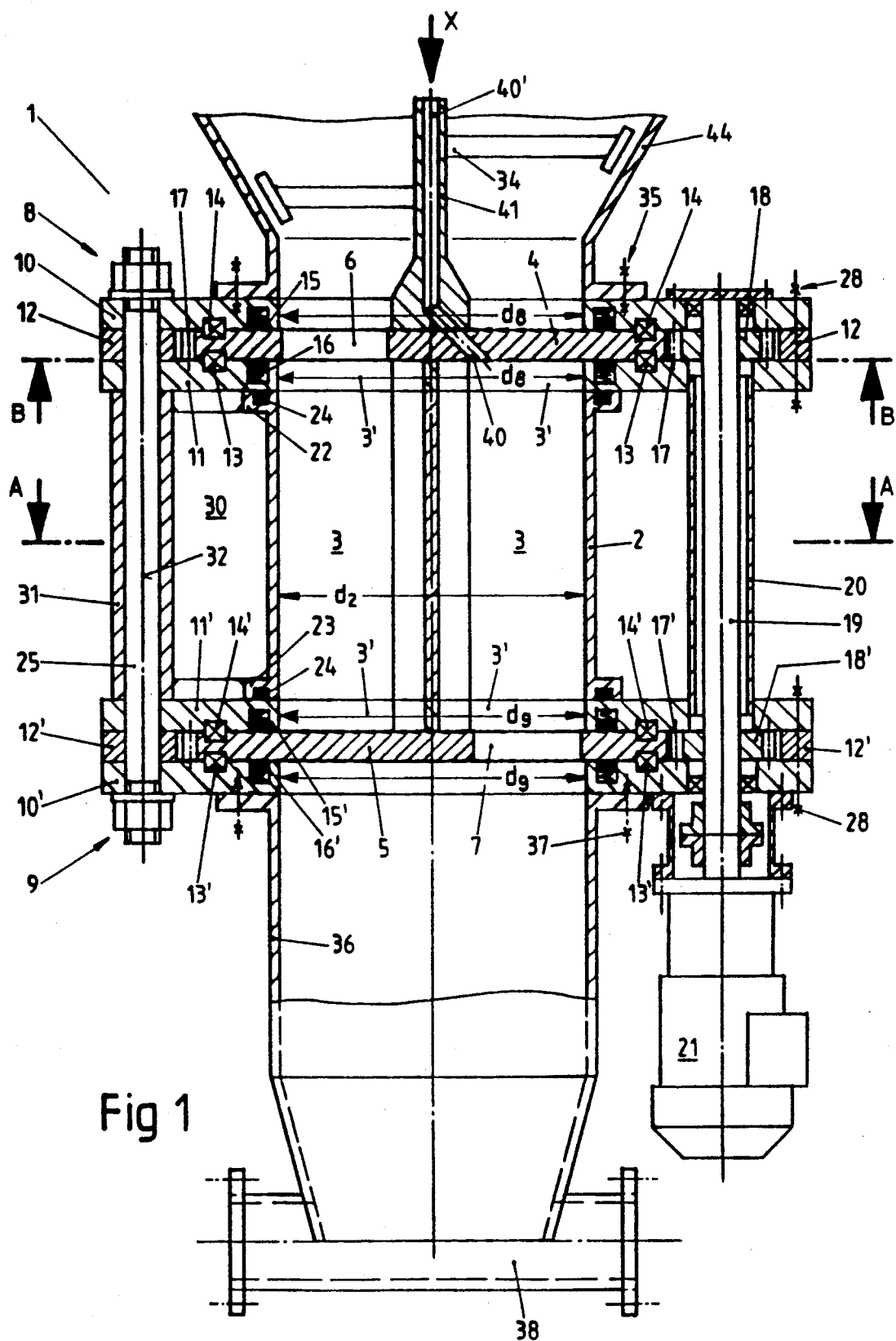
FIG. 1 shows a longitudinal section through the dispensing appliance according to the invention.
Figure 2:
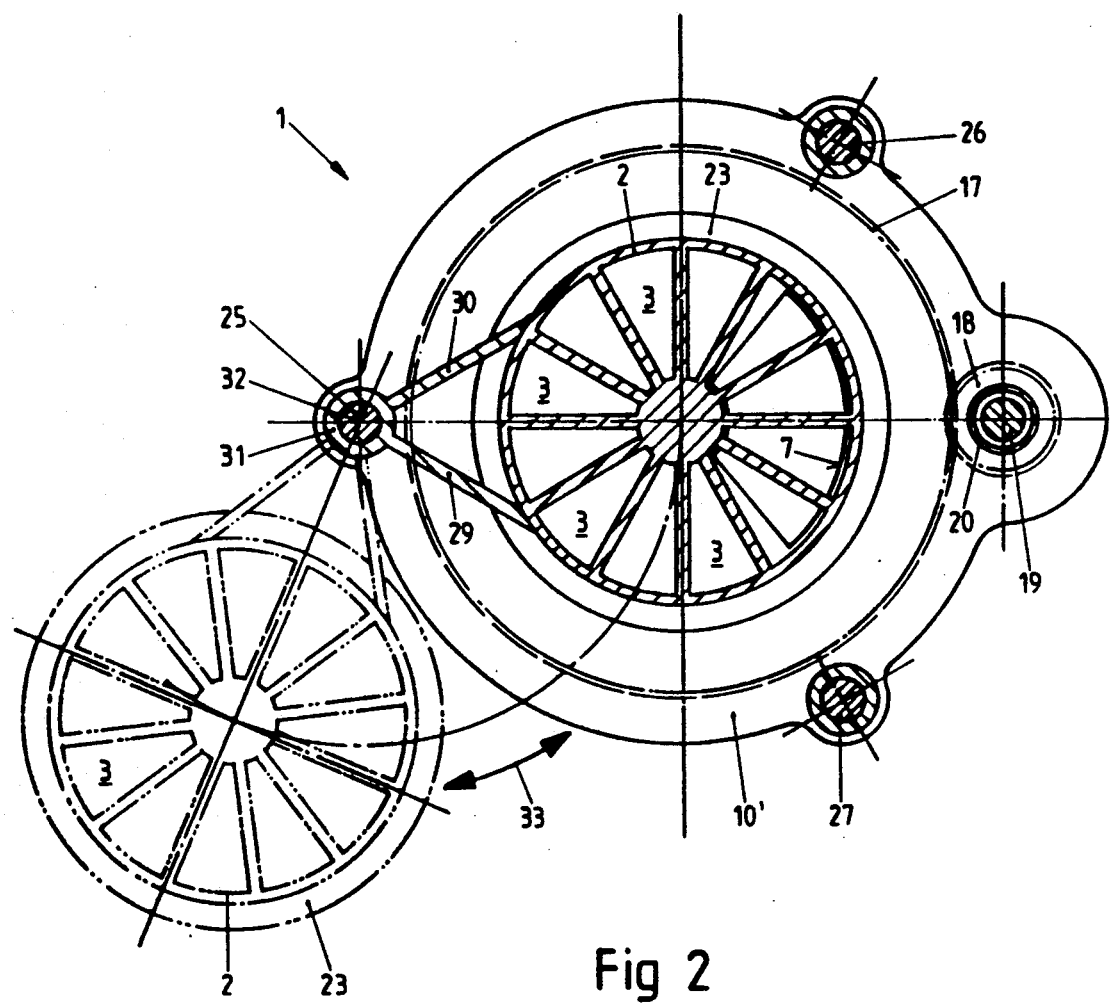
FIG. 2 shows a section along the sectional line A—A in FIG. 1.
Figure 3:
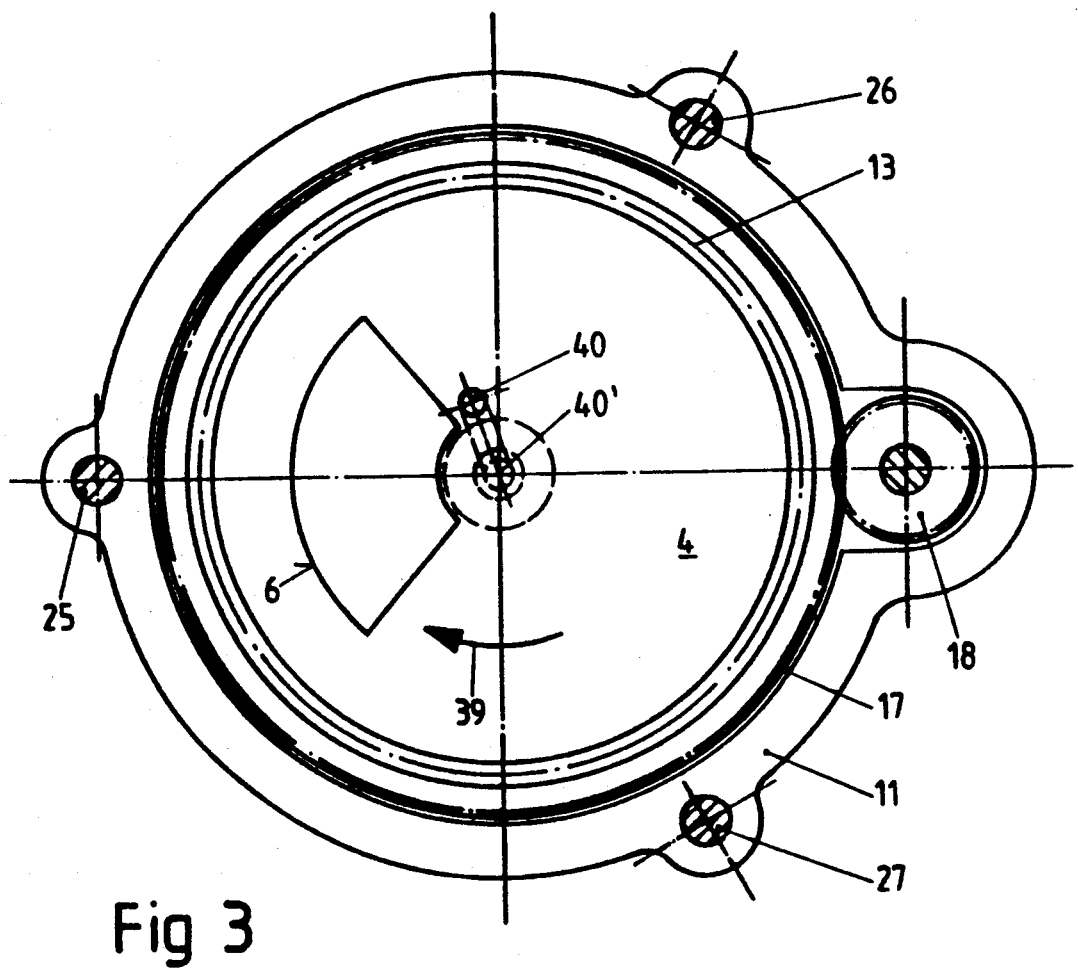
FIG. 3 shows a section along the sectional line B—B in FIG. 1.

The dispensing appliance 1 shown in longitudinal section in FIG. 1 consists of a cylindrical cellular housing 2 which, according to the representation of FIG. 2, is divided into a plurality of individual chambers 3 of a cross-section in the form of a segment of a circle or segment of an annulus. The representation in FIG. 2 shows 12 such individual chambers 3. The cellular housing 2 is covered in its upper region by an upper cover plate 4 and in its lower region by a lower cover plate 5. Each of these circular cover plates 4, 5 has a cutout in the form of a segment of an annulus which is designed as an upper feed orifice 6 and as a lower discharge orifice 7. In FIG. 2, the lower discharge orifice 7 is shown as a segment of an annulus underneath the chambers 3 in the right-hand half of the Figure. FIG. 3 shows the upper surface 6 in the form of a segment of an annulus within the upper cover plate 4. It is evident from FIG. 1 that the feed orifice 6 is arranged offset relative to the discharge orifice 7 at a rotary angle of 180°. Consequently, each chamber 3 can have simultaneously a maximum of only one feed orifice or one discharge orifice when the cover plates 4, 5 rotate.

The cover plates 4, 5 are each embedded or integrated in a receiving flange 8, 9. The upper receiving flange 8 consists of an upper flanged plate 10 and of a lower flanged plate 11 which are at such a distance from one another via spacers 12 that the upper cover plate 4 is guided with the least possible play between these flanged plates 10, 11. For guiding the upper cover plate 4, there are a lower ball bearing 13 and an upper ball bearing 14 which carry out the axial and radial mounting of the upper cover plate 4 between the two flanged plates 10, 11. The foregoing applies accordingly to the lower cover plate 5.

Provided radially inwards in relation to the ball bearings 13, 14 are upper and lower seals 15, 16 which provide a sealing relative to the interior of the dispensing appliance. The inside diameter $d_8$, $d_9$ of the receiving flanges 8, 9 for the passage of the material corresponds to the inside diameter $d_2$ of the cellular housing 2, so that no build-up of material occurs. The flanges 11, 11' confronting the cellular housing 2 can be coincidental in their inner cross-sectional region with the cross-section of the cellular housing 2, that is to say coincidental chambers 3' are present. The flanges 11, 11' thus constitute an axial extension of the cellular housing 2 with chambers 3, 3'.

The upper cover plate 4 is driven via an external toothing 17 of the circular cover plate 4 which interacts with a driving pinion 18. The pinion 18 is driven from a drive motor 21 via a vertical driving shaft 19 which is protected in a shaft housing 20.

The construction of the lower receiving flange 9 for embedding or enclosing the lower cover plate 5 is mirror-symmetrically identical to the above-described arrangement of the upper receiving flange 8. Like parts also bear the same reference symbols.

The driving shaft 19 thus likewise drives the upper driving pinion 18 for the upper cover plate 4 and the lower driving pinion 18' for the lower cover plate 5. The two orifices 6, 7 thereby always run synchronously with one another, offset at a rotary angle of 180°.

The cellular housing 2 with the individual chambers 3 is connected to respective flanged plates 11, 11' of the receiving flanges 8, 9 via an upper transitional flange 22 and a lower transitional flange 23, each having a sealing arrangement 24. To hold the entire dispensing appliance together, according to the illustration in FIG. 2 there are at an angular spacing of 120° three tension rods 25 to 27 which brace the cellular housing 2 by means of the receiving flanges 8, 9. At the same time, a further multiply arranged screw connection 28 serves for connecting the upper and lower flanged plates 10, 11 or 10', 11'.

The cellular housing 2 is connected, via two junction flanges 29, 30 arranged in a V-shaped manner relative to one another (see FIG. 2), to a rotary bush 31 which closes as a bearing bush around the tension rod 25. Consequently, as is evident from FIG. 2, for example after a release and slackening of the tension rods 25 to 27, the cellular housing 2 can be pivoted outwards about the vertical longitudinal axis 32, this being shown by the pivoting direction 33. This pivoting position of the cellular housing 2 is represented by dot-and-dash lines in FIG. 2. During this operation, all the screw connections 28 for holding together the upper and lower flanged plates 10, 11 are maintained completely, so that the arrangement and functioning of the receiving flanges 8, 9 remain completely unaffected by the pivoting operation. There is therefore no need for a complicated readjustment or alignment of these parts after each pivoting operation.

In the pivoted-out position according to FIG. 2, therefore, the cellular housing 2 constructed very simply with straight mutually aligned individual chambers 3 can be thoroughly cleaned and serviced in a very simple way.

The cellular housing 2 is pivoted out only in relation to the lower flanged plate 11 of the upper receiving flange 8 and the upper flanged plate 11' of the lower receiving flange 9, with corresponding sealing by means of the sealing arrangement 24.

In the upper region, a feed funnel 44 with an agitator 34 for loosening and feeding bulk material is placed onto the dispensing appliance 1. A screw connection 35 serves for connecting the feed funnel 44 to the upper flanged plate 10. The agitator 34 is not shown in any detail in the top view according to FIG. 4.

Likewise, a cylindrical discharge connection piece 36 is fastened to the lower flanged plate 10' of the dispensing appliance 1 in the lower region of the latter via a screw connection 37. The discharge connection piece 36 opens at its lower end into a horizontal conveying line 38 for bulk material.

The horizontal conveying line 38 can have a high conveying pressure, for example of 3 bar, for conveying the bulk material. This pressure is propagated via the lower discharge orifice 7 into the individual chambers 3, so that a pressure level of the same amount prevails here. As a result of the rotation of the upper and lower cover plates (see arrow 39), the upper feed orifice 6, when passing over each new chamber orifice, would experience a sharp pressure compensation between the individual chamber 3 and feed funnel 44 which would cause the bulk material falling down per se to be thrown up somewhat. The degree of filling of each individual chamber and therefore also the entire dispensing capacity of the dispensing appliance 1 are thereby impaired considerably. To ensure a pressure compensation even before the upper feed orifice 6 passes over a new individual chamber 3, there is a pressure-compensating line 40 which leads the upper feed orifice 6 and which consequently is already providing pressure compensation between the feed funnel 44 and a respective individual chamber 3 when the latter is no longer connected to the lower discharge orifice 7 and not yet connected to the upper feed orifice 6. The pressure-compensating line 40 is connected to the interior of the feed funnel 44 via the central driving axle 41 for the agitator 34. The upper line portion is designated by 40' (see also FIGS. 3 and 4).

Figure 4:
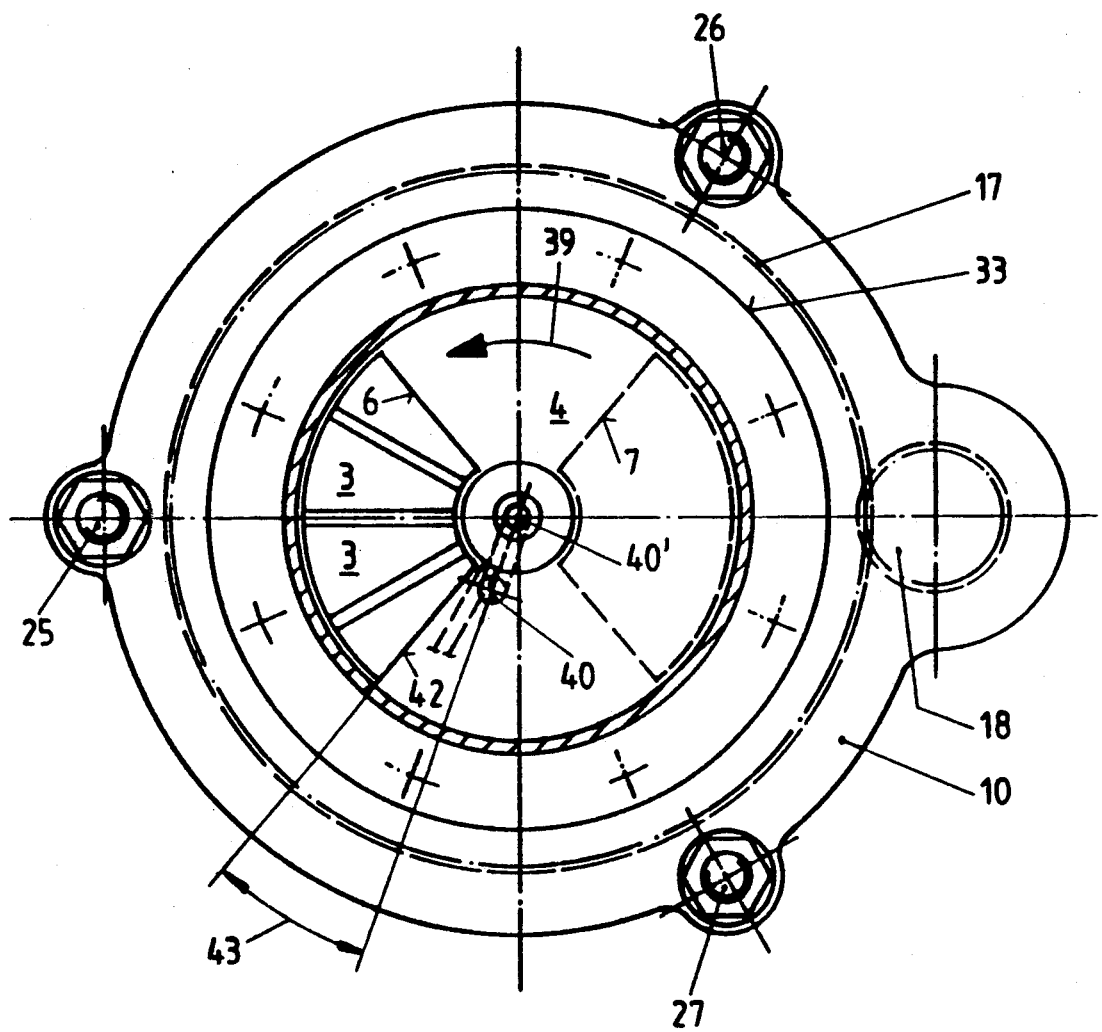
FIG. 4 shows a top view according to the arrow X.

As shown in FIG. 4, the opening angle of the upper and lower feed orifices 6, 7 is of a size which spans approximately three individual chambers 3. The pressure-compensating line 40 is therefore arranged in such a way that it leads at the front edge 42 of the rotating upper feed orifice 6 by a small amount 43.

The invention is not restricted to the exemplary embodiment illustrated and described. On the contrary, it also embraces all developments within the scope of the inventive idea which are open to an average person skilled in the art. For example, flanged plates 11, 11' may be formed integrally with housing 2.

What is claimed is:

1. An appliance for dispensing of bulk material, comprising:
   a circular-cylindrical stationary cellular housing with individual chambers of a cross-section in the form of a segment of a circle, which are closed in an upper and lower region by respective upper and lower rotating cover plates each having an orifice in the form of a segment of an annulus, the dispensing appliance having in its upper and lower region respective receiving flanges for supporting and guiding the rotating cover plates external of said housing,
   wherein the upper receiving flange and the lower receiving flange for the respective cover plates are formed by respective flanged plates facing away from the cellular housing and respective flanged plates confronting the cellular housing, between which flanged plates the respective cover plates are supported and mounted rotatably on bearings provided in each of the respective flanged plates axially opposite one another, and
   wherein the appliance further comprises means for rotating the upper and lower cover plates comprising a common eccentric drive arranged laterally of the cellular housing.

2. The appliance as claimed in claim 1, wherein the upper and the lower cover plates comprise respective external toothings which are connected to associated driving pinions of the drive.

3. The appliance as claimed in claim 1, wherein the drive further comprises driving pinions for the upper and lower cover plates, said pinions being connected to one another via a common vertical driving shaft and the appliance further comprises a common motor which comprises means for synchronously driving the cover plates.

4. The appliance as claimed in claim 1, wherein the means for rotating the upper and lower cover plates comprises respective toothed belts or roller chains surrounding the cover plates.

5. The appliance as claimed in claim 1, wherein the cover plates are mounted with the flanged plates via said bearings located outside the housing.

6. The appliance as claimed in claim 1, wherein the upper and the lower receiving flanges for the respective cover plates are arranged mirror-symmetrically, and the cellular housing is braced and sealed off confronting it by means for bracing and means for sealing off, respectively.

7. The appliance as claimed in claim 1, wherein the flanged plates confronting the cellular housing are made in one piece with the cellular housing.

8. The appliance as claimed in claim 1, wherein the flanged plates have inside diameters corresponding to an inside diameter of the cellular housing, and wherein the bearings and the drive are sealed off relative to the interior of the cellular housing by means of a seal disposed between said cover plates and said flanged plates adjacent to an outside surface of said cellular housing.

9. The appliance as claimed in claim 1, wherein the dispensing appliance is connectable to a pneumatic conveying line by a feed funnel with a differential pressure relative to the feed funnel on the order of several bar.

10. The appliance as claimed in claim 1, wherein the upper rotating cover plate has, in a region leading an edge of the orifice thereof, pressure compensating means comprising a pressure-compensating line for successively providing pressure compensation for each of said chambers in turn between the pressure in a chamber and the pressure in an interior of the feed funnel.

11. The appliance as claimed in claim 1, wherein the flanged plates confronting the cellular housing have sealing means disposed in a region adjacent to the cellular housing and have extension chambers which coincide with the respective individual chambers of said cellular housing, the extension chambers thereby forming axial extensions of said individual chambers.

12. The appliance especially as claimed in claim 1, wherein the circular-cylindrical cellular housing is braced between the upper receiving flange and the lower receiving flange receiving the respective cover plates by means for pivoting comprising a plurality of tension rods extending axially through said cover plates and said upper and lower flanges thereby forming at least one vertical pivot axle for the cellular housing so that the cellular housing is pivotable out of operating position.

13. The appliance as claimed in claim 12, wherein said plurality of tension rods comprise three vertical tension rods centrally surrounding the cellular housing, one tension rod having a rotary bush which is connected to the cellular housing via two junction flanges, arranged in a V-shaped manner, or a corresponding hinge.

14. An appliance for dispensing of bulk material, comprising:
  a circular-cylindrical stationary cellular housing with individual chambers of a cross-section in the form of a segment of a circle, which is closed in an upper and lower region by respective upper and lower rotating cover plates each having an orifice in the form of a segment of an annulus, the dispensing appliance having in upper and lower regions thereof respective receiving flanges for the rotating cover plates,
  wherein the upper receiving flange and the lower receiving flange for the respective cover plates are formed by respective flanged plates facing away from the cellular housing and respective flanged plates confronting the cellular housing, between which the respective cover plates are mounted rotatably on ball bearings located axially opposite one another, and
  wherein the appliance further comprises an eccentric drive arranged laterally of the cellular housing and said drive comprises means for rotating the cover plates, and
  wherein the upper and the lower cover plates comprise respective external toothings which are connected to associated driving pinions of the drive.

15. An appliance for dispensing of bulk material, according to claim 14, wherein the driving pinions comprise a pinion for the upper cover plate and a pinion for the lower cover plate, said pinions being connected to one another via a common vertical driving shaft, and the appliance further comprises a common motor which comprises means for synchronously driving the cover plates.

16. An appliance for dispensing of bulk material, comprising:
  a circular-cylindrical stationary cellular housing with individual chambers of a cross-section in the form of a segment of a circle, which is closed in an upper and lower region by respective upper and lower rotating cover plates each having an orifice in the form of a segment of an annulus, the dispensing appliance having in upper and lower regions thereof respective receiving flanges for the rotating cover plates,
  wherein the upper receiving flange and the lower receiving flange for the respective cover plates are formed by respective flanged plates facing away from the cellular housing and respective flanged plates confronting the cellular housing, between which the respective cover plates are mounted rotatably on ball bearings located axially opposite one another, and
  wherein the appliance further comprises an eccentric drive arranged laterally of the cellular housing and said drive comprises means for rotating the cover plates, and
  wherein the means for rotating the upper and lower cover plates comprises respective toothed belts or roller chains surrounding the cover plates.

17. An appliance for dispensing of bulk material according to claim 16 wherein the circular-cylindrical cellular housing is braced between the upper receiving flange and the lower receiving flange receiving the respective cover plates by means for pivoting, the means for pivoting comprising a plurality of tension rods forming at least one vertical pivot axle for the cellular housing so that the cellular housing is pivotable out of operating position, and
  wherein said plurality of tension rods comprise three vertical tension rods centrally surrounding the cellular housing, one tension rod having a rotary bush which is connected to the cellular housing via two junction flanges, arranged in a V-shaped manner, or a corresponding hinge.

* * * * *